(12) United States Patent
Takamatsu

(10) Patent No.: US 9,969,510 B2
(45) Date of Patent: May 15, 2018

(54) MANUFACTURING METHOD AND MANUFACTURING DEVICE FOR WRAPPED MOLDING

(71) Applicant: Enplas Corporation, Saitama (JP)

(72) Inventor: Shota Takamatsu, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 499 days.

(21) Appl. No.: 14/759,248

(22) PCT Filed: Dec. 16, 2013

(86) PCT No.: PCT/JP2013/007393
§ 371 (c)(1),
(2) Date: Jul. 6, 2015

(87) PCT Pub. No.: WO2014/108962
PCT Pub. Date: Jul. 17, 2014

(65) Prior Publication Data
US 2016/0001901 A1    Jan. 7, 2016

(30) Foreign Application Priority Data
Jan. 9, 2013   (JP) .................. 2013-001958

(51) Int. Cl.
| | |
|---|---|
| B65B 11/40 | (2006.01) |
| B65B 47/04 | (2006.01) |
| B29C 45/00 | (2006.01) |
| B65B 47/02 | (2006.01) |

(Continued)

(52) U.S. Cl.
CPC .............. B65B 11/40 (2013.01); B29C 43/02 (2013.01); B29C 45/0084 (2013.01);
(Continued)

(58) Field of Classification Search
CPC ....... B29C 51/421; B29C 51/46; B65B 47/02; B65B 9/045; B65B 11/50; B65B 11/52; B65B 11/40
(Continued)

(56) References Cited

U.S. PATENT DOCUMENTS 4,559,192 A * 12/1985 O'Malley ............... B29C 33/36
                                                            264/338
4,951,444 A *  8/1990 Epstein .................. B29C 51/46
                                                            53/433

(Continued)

FOREIGN PATENT DOCUMENTS

| | | |
|---|---|---|
| JP | 2010-095305 A | 4/2010 |
| JP | 2010-111020 A | 5/2010 |
| JP | 2011-046412 A | 3/2011 |

*Primary Examiner* — Andrew M Tecco
*Assistant Examiner* — Nicholas Igbokwe
(74) *Attorney, Agent, or Firm* — Brundidge & Stanger, P.C.

(57) ABSTRACT

This manufacturing method for wrapped moldings (P) comprises a molding process for manufacturing the moldings (P) and a wrapping process for wrapping the moldings (P). The molding cycle from a mold-clamping step to the next mold-clamping step in the molding process is coordinated with the wrapping cycle from a moving step to the next moving step in the wrapping process by delaying the heating initiation time in the heating step, reducing the rate of temperature increase in the heating step, or prolonging the time for the drawing in the drawing step.

4 Claims, 8 Drawing Sheets

(51) Int. Cl.
- *B65B 7/16* (2006.01)
- *B29C 43/02* (2006.01)
- *B65B 35/10* (2006.01)
- *B65B 51/10* (2006.01)
- *B29C 45/76* (2006.01)
- *B29C 45/42* (2006.01)
- *B65B 5/04* (2006.01)
- *B29L 9/00* (2006.01)
- *B29L 31/00* (2006.01)
- *B29C 45/17* (2006.01)

(52) U.S. Cl.
CPC .......... *B29C 45/42* (2013.01); *B29C 45/7626* (2013.01); *B65B 7/164* (2013.01); *B65B 35/10* (2013.01); *B65B 47/02* (2013.01); *B65B 47/04* (2013.01); *B65B 51/10* (2013.01); *B29C 45/1769* (2013.01); *B29C 2045/4266* (2013.01); *B29C 2945/7617* (2013.01); *B29C 2945/76816* (2013.01); *B29C 2945/76899* (2013.01); *B29L 2009/00* (2013.01); *B29L 2031/753* (2013.01); *B65B 5/04* (2013.01)

(58) Field of Classification Search
USPC ....... 53/428, 122, 453, 559, 561, 55–58, 77, 53/52; 246/40.1, 40.6, 40.7, 544, 553
See application file for complete search history.

(56) References Cited

U.S. PATENT DOCUMENTS

| | | | | |
|---|---|---|---|---|
| 5,524,419 A * | 6/1996 | Shannon | B29C 33/36 | 264/1.1 |
| 5,776,514 A * | 7/1998 | Wu | B29C 45/2737 | 264/328.15 |
| 7,393,373 B1 * | 7/2008 | Krippner | B29C 45/1701 | 128/205.26 |
| 8,241,027 B2 * | 8/2012 | Kitta | B29C 45/5008 | 425/145 |
| 2002/0180080 A1 * | 12/2002 | Suzuki | B29C 45/76 | 264/40.1 |
| 2003/0111756 A1 * | 6/2003 | Morita | B29C 45/5008 | 264/40.5 |
| 2003/0224085 A1 * | 12/2003 | Onuma | B29C 45/5008 | 425/550 |
| 2008/0023861 A1 * | 1/2008 | Turng | B29C 45/76 | 264/40.1 |
| 2008/0150181 A1 * | 6/2008 | Maruyama | B29C 45/766 | 264/40.7 |
| 2010/0112120 A1 * | 5/2010 | Kitta | B29C 45/1761 | 425/542 |
| 2011/0260363 A1 * | 10/2011 | Falzoni | B29C 45/0055 | 264/295 |

* cited by examiner

MANUFACTURING METHOD AND MANUFACTURING DEVICE FOR WRAPPED MOLDING

TECHNICAL FIELD

The present invention relates to a manufacturing method and a manufacturing apparatus for a packaged molded article.

BACKGROUND ART

Conventionally, chips for inspection tools (pipettes) used in the medical field and the like have been manufactured by injection molding. In some cases, the chips manufactured by injection molding are individually packaged with a film or the like before they are shipped.

PTL 1 discloses an injection molding machine for manufacturing an injection-molded article. The injection molding machine disclosed in PTL 1 includes an injection device and a mold clamping device. The injection device includes a cylinder for heating pellet as a raw material to obtain melted resin, and a screw for injecting melted resin to a metal mold. In addition, the mold clamping device includes a metal mold and a mold clamping mechanism for holding the metal mold at the time when the melted resin is injected. In this injection molding machine, the melted resin is injected by the cylinder into the metal mold fixed by the mold clamping mechanism with a predetermined pressure. The resin supplied in the metal mold is subjected to pressure holding and cooling for a predetermined time. Finally, the metal mold is opened, and the injection-molded article is taken out.

In addition, PTL 2 discloses a deep drawing mold packaging machine that packages an object with two films. The deep drawing mold packaging machine disclosed in PTL 2 includes a forming device for forming a recessed pocket in a lower film, a covering means for covering with upper film a pocket in which a packaged object is inserted, a sealing means for sealing the outer periphery portion of the pocket and the upper film, and a cutting means for cutting the sealed two films between the products. In this deep drawing packaging machine, a packaged object is housed in the pocket of the lower film, and the upper film is covered so as to cover the pocket. Next, the outer periphery portion of the pocket and the upper film are sealed, and then the two films thus sealed are cut at a predetermined position.

Typically, a molding cycle in an injection molding machine such as that disclosed in PTL 1 requires a certain period of time for pressure holding and cooling, and thus requires a period of time longer than the packaging cycle in a deep drawing mold packaging machine such as that disclosed in PTL 2.

CITATION LIST

Patent Literature

PTL 1
Japanese Patent Application Laid-Open No. 2010-111020
PTL 2
Japanese Patent Application Laid-Open No. 2010-095305

SUMMARY OF INVENTION

Technical Problem

In the medical fields and the like, medical equipment, medicinal products and the like which are guaranteed by inspection that the amount of adhering endotoxin is equal to or lower than a prescribed value and whose hygiene is ensured are used for the purpose of raising patient's survival rate. In such inspection of endotoxin contamination, inspection tools using chips which are manufactured in a endotoxin-free clean environment, and whose clean and endotoxin-free property is ensured by individual packaging and the like are used.

For example, in the case where injection-molded articles formed by an injection molding machine such as that disclosed in PTL 1 are successively and individually packaged by a packaging machine such as that disclosed in PTL 2, the time required for the molding cycle is longer than that of the packaging cycle, and therefore the injection-molded articles may be manufactured in advance and temporarily stored. In addition, an injection-molded article taken out from a metal mold may be conveyed to a packaging position by a belt conveyor whose speed is adjusted to the packaging cycle. In such cases, the injection-molded articles may be contaminated while they are temporarily stored, or while they are conveyed by the belt conveyor.

On the other hand, when the molding cycle of injection-molded articles is shortened to match the molding cycle and the packaging cycle with each other, injection-molded articles cannot be stably manufactured.

An object of the present invention is to provide a manufacturing method and a manufacturing apparatus which can stably manufacture a packaged molded article in which hygiene of the molded article housed inside is ensured.

Solution to Problem

A manufacturing method for a packaged molded article according to embodiments of the present includes: molding to form a molded article; packaging the molded article; and conveying the molded article from the molding to the packaging, wherein: the molding includes: mold-clamping an opened metal mold after the molded article is taken out from a metal mold, filling the metal mold with resin, pressure-holding the resin in the metal mold, mold-opening the metal mold, and taking out the molded article from the opened metal mold, wherein the packaging includes: heating a bottom film, drawing the heated bottom film to form a pocket, housing the molded article in the pocket, sealing with a top film an opening of the pocket in which the molded article is housed, and moving the bottom film by a predetermined distance; wherein the conveying includes: conveying the molded article taken out from the opened metal mold into the pocket to perform the housing, and wherein: at least the heating, the housing and the sealing are performed after the moving; and a time during which the bottom film is kept stopped between each moving in the packaging is matched with a molding cycle between each mold-clamping in the molding by delaying a heating start time in the heating, by reducing a temperature rising rate in the heating, or by increasing a drawing time in the drawing.

A manufacturing apparatus for a packaged molded article according to the embodiments of the present invention includes: a molding machine that forms a molded article; a packaging machine that packages the molded article; a conveying machine that conveys the molded article from the molding machine to the packaging machine; and a control section that controls the molding machine, the packaging machine and the conveying machine, wherein: the molding machine performs molding, the molding including: mold-clamping an opened metal mold after a molded article is taken out from the metal mold, filling the metal mold with resin, pressure-holding the resin in the metal mold, and mold-opening the metal mold; the packaging machine performs packaging, the packaging including: heating a bottom film, drawing the heated bottom film to form a pocket, housing the molded article in the pocket, sealing with a top film an opening of the pocket in which the molded article is housed, and moving the bottom film by a predetermined distance; the conveying machine performs taking out the molded article from the metal mold opened by the mold-opening, and conveying the molded article taken out from the opened metal mold into the pocket to perform the housing, the control section controls the molding machine, the packaging machine and the conveying machine; and the control section synchronizes the mold-opening performed by the molding machine in the molding to the taking out performed by the conveying machine with the moving performed by the packaging machine in the packaging in which a stopping time of the bottom film is adjusted to the conveying performed by the conveying machine by delaying a heating start time in the heating, by reducing a temperature rising rate in the heating, or by increasing a drawing time in the drawing.

Advantageous Effects of Invention

According to the present invention, a packaged molded article in which hygiene of the molded article housed inside is ensured can be stably manufactured.

DESCRIPTION OF EMBODIMENTS

In the following, embodiments of the present invention will be described in detail with reference to the accompanying drawings.

Embodiment 1

(Configuration of Manufacturing Apparatus for Packaged Molded Article)

Figure 1:
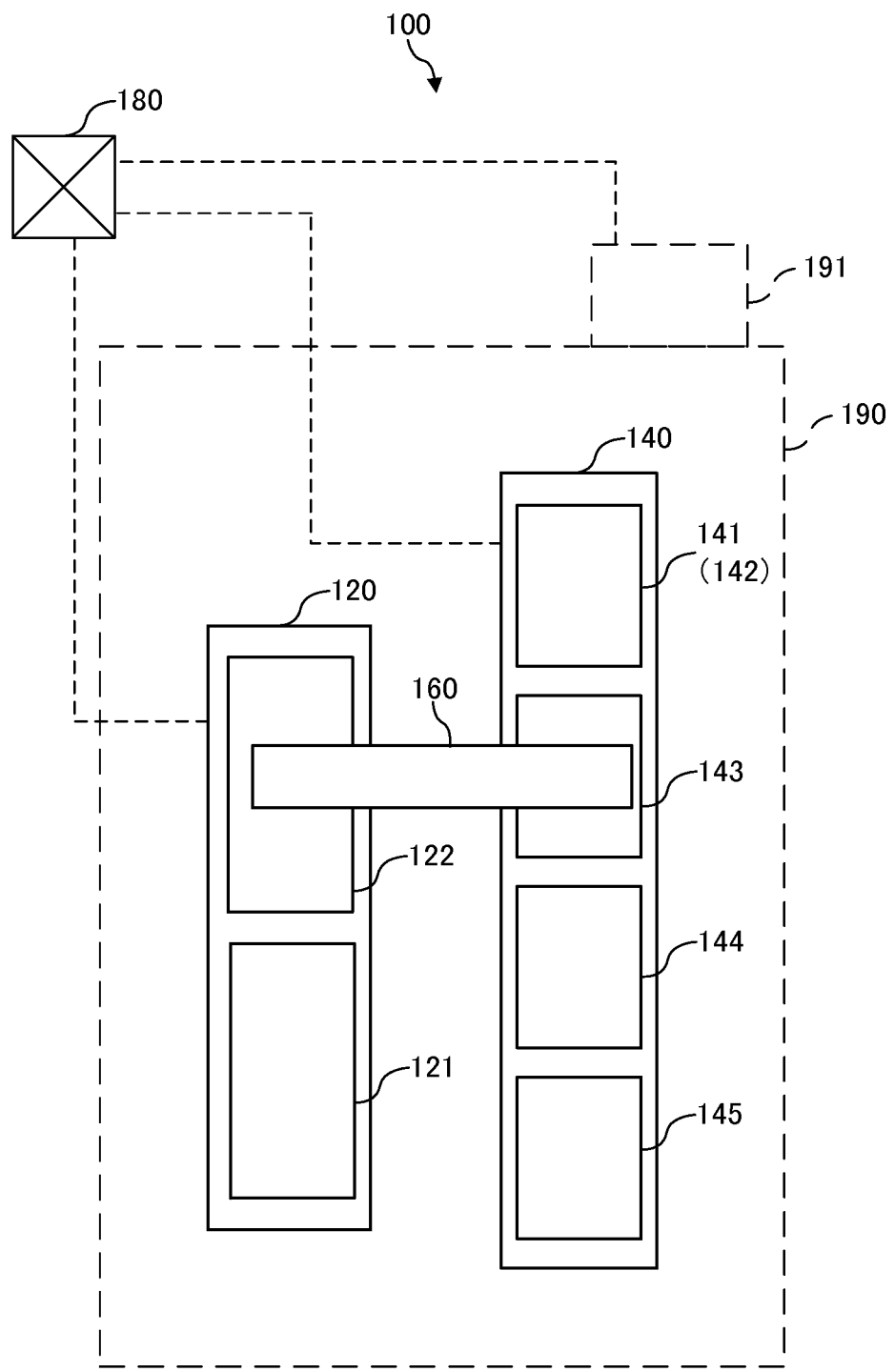
FIG. 1 is a schematic plan view of a manufacturing apparatus according to Embodiment 1 of the present invention.

FIG. 1 is a schematic plan view of manufacturing apparatus 100 for packaged molded article P according to Embodiment 1 (hereinafter referred to also simply as "manufacturing apparatus").

As illustrated in FIG. 1, manufacturing apparatus 100 includes injection molding machine 120, packaging machine 140, conveying machine 160 and control section 180. In manufacturing apparatus 100, injection-molded article P produced by injection molding machine 120 is conveyed by conveying machine 160 to packaging machine 140, and then injection-molded article P is individually packaged by packaging machine 140.

Manufacturing apparatus 100 is housed in clean room 190 whose hygiene is maintained. Clean room 190 is provided with air conditioner 191 for ensuring the cleanliness in clean room 190. Basically, manufacturing apparatus 100 can be unattendedly run except for supply of the material of injection-molded article P, replacement of consumables used for packaging and the like.

(Configuration of Molding Machine)

Figure 2:
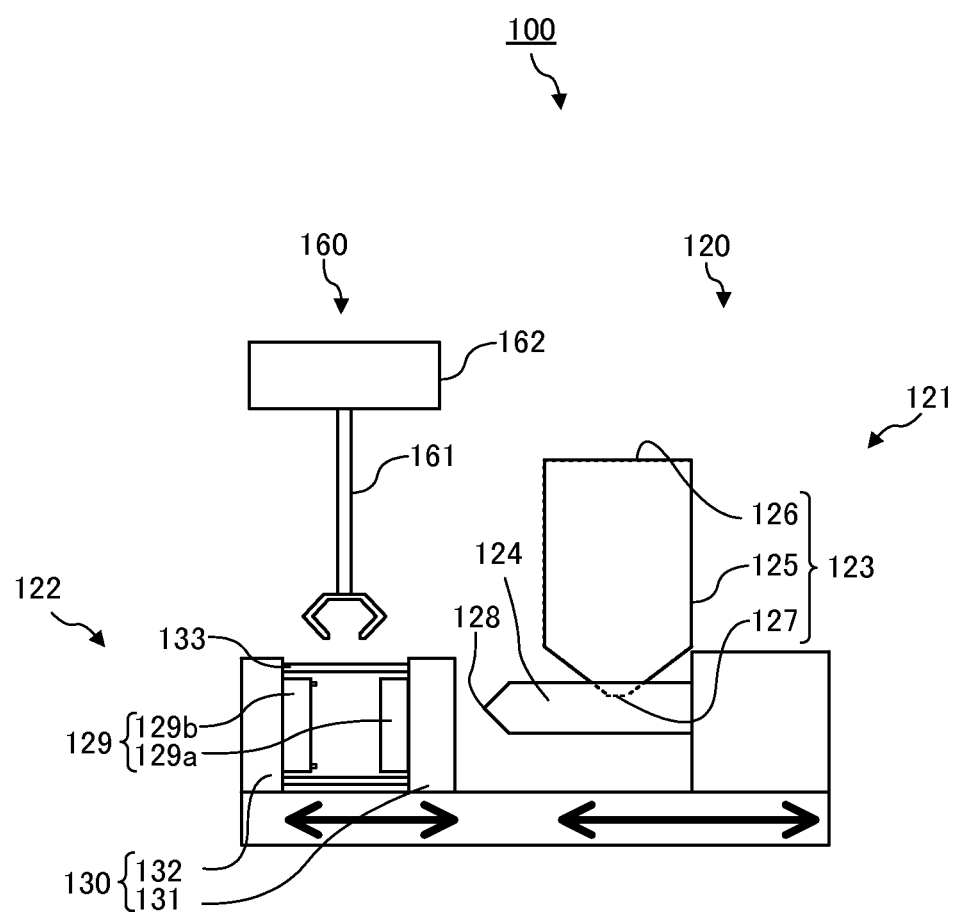
FIG. 2 is a schematic left side view of the manufacturing apparatus according to Embodiment 1 of the present invention.

FIG. 2 is a schematic side view of manufacturing apparatus 100 for manufacturing packaged molded article P according to Embodiment 1 as viewed from injection molding machine 120 side. In FIG. 2, packaging machine 140 and control section 180 are omitted.

Injection molding machine 120 performs a molding process of manufacturing injection-molded article P. Injection molding machine 120 includes injection section 121 and mold clamping section 122. Injection section 121 and mold clamping section 122 are controlled by control section 180.

Injection section 121 fills metal mold 129 of mold clamping section 122 with resin. Injection section 121 includes hopper 123 and cylinder 124.

Hopper 123 stores input resin, and introduces the stored resin into cylinder 124. Hopper 123 includes hopper main body 125, input port 126, and communication port 127. Hopper main body 125 temporarily stores resin. Input port 126 is provided at the upper end of hopper main body 125 and configured for input of resin. Communication port 127 is provided at the lower end of hopper main body 125 and configured to introduce resin into cylinder 124. The type of resin to be input is not limited, and may be appropriately selected in accordance with the use of injection-molded article P. In addition, while the form of the resin to be input is not limited, a pellet form is preferable from the standpoint of handleability.

Cylinder 124 injects melted resin obtained by melting resin into metal mold 129. Nozzle section 128 serving as an injection port of the melted resin is provided at an end of cylinder 124, and hopper 123 is in communication with cylinder 124 on the bottom end side of cylinder 124. Cylinder 124 and hopper 123 are configured to be movable forward and backward with respect to mold clamping section 122.

Mold clamping section 122 closes metal mold 129 at the time of molding injection-molded article P, and opens metal mold 129 at the time of removing injection-molded article P. Mold clamping section 122 includes metal mold 129 and mold clamping mechanism 130.

Metal mold 129 includes first metal mold 129a (fixed metal mold) and second metal mold 129b (movable metal mold). When first metal mold 129a and second metal mold 129b are brought into contact with each other, a cavity having a shape corresponding to the shape of injection-molded article P is formed.

Mold clamping mechanism 130 closes metal mold 129 at the time of molding injection-molded article P, and opens metal mold 129 at the time of removing injection-molded article P. Mold clamping mechanism 130 includes first plate 131 on which first metal mold 129a is fixed, second plate 132 on which second metal mold 129b is fixed, and a plurality of rails 133 that connect first plate 131 and second plate 132 together. First metal mold 129a fixed on first plate 131 is configured to be movable forward and backward with respect to second metal mold 129b through rails 133.

Injection section 121 melts the resin introduced from hopper 123 in heated cylinder 124 to obtain melted resin. Then, injection section 121 injects the melted resin into metal mold 129. Meanwhile, mold clamping section 122 fixes first metal mold 129a and second metal mold 129b in the state where first metal mold 129a and second metal mold 129b are in contact with each other until melted resin is injected, and, after the melted resin is injected, subjects first metal mold 129a and second metal mold 129b to pressure holding and cooling for a given period of time to obtain injection-molded article P. Then, mold clamping section 122 opens metal mold 129 and removes injection-molded article P.

(Configuration of Packaging Machine)

Figure 3:
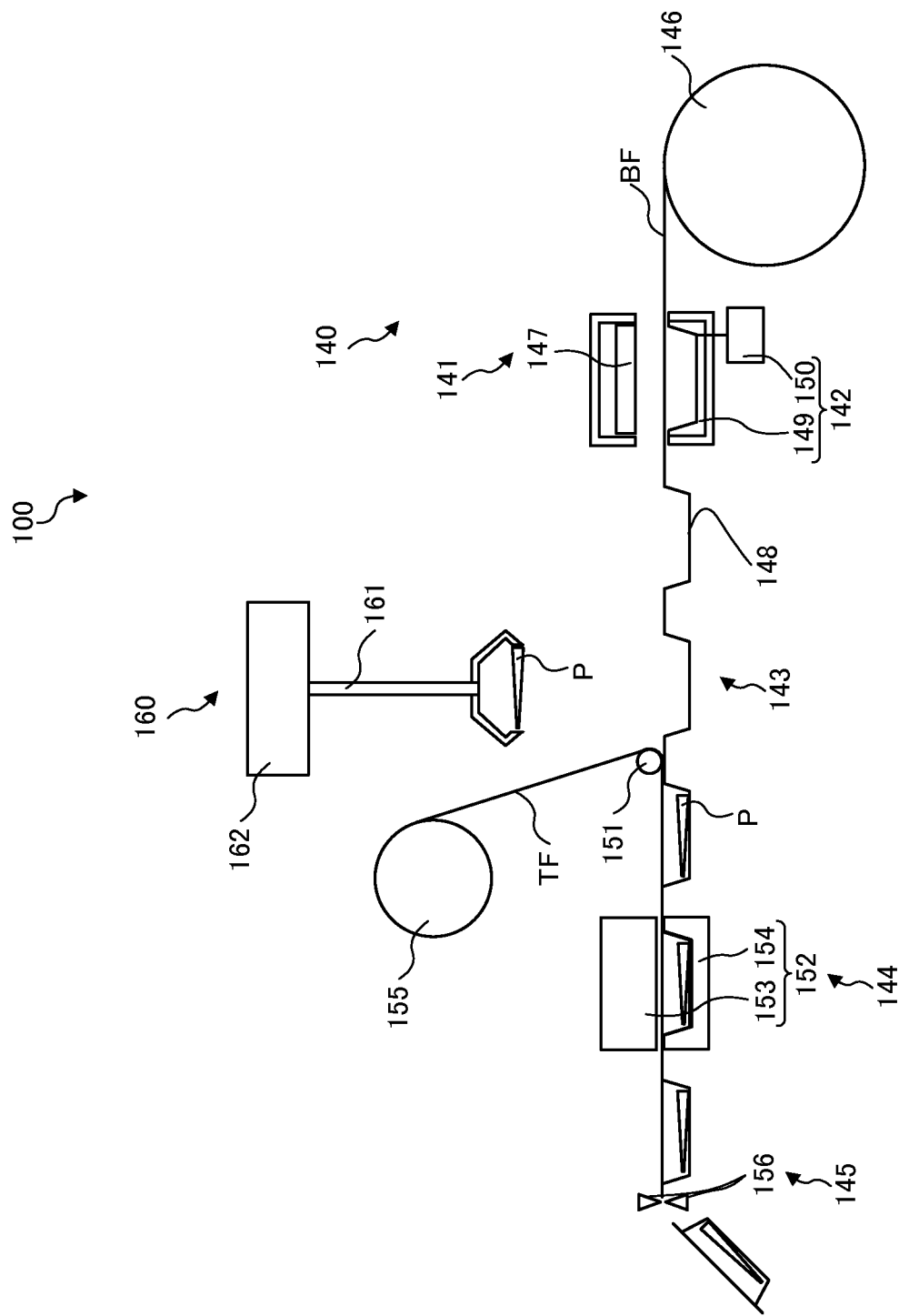
FIG. 3 is a schematic right side view of the manufacturing apparatus according to Embodiment 1 of the present invention.

FIG. 3 is a schematic side view of manufacturing apparatus 100 for manufacturing packaged injection-molded article P according to Embodiment 1 as viewed from packaging machine 140 side. In FIG. 3, injection molding machine 120 and control section 180 are omitted.

Packaging machine 140 performs a packaging process of packaging injection-molded article P. Packaging machine 140 includes heating section 141, drawing section 142, housing section 143, sealing section 144, and cutting section 145. Movement of bottom film BF and top film TF that are used for packaging is controlled by control section 180.

Packaging machine 140 successively performs a process in which deep drawing is performed on bottom film BF, which is horizontally and intermittently fed from first rolled web 146, to form pocket 148, and, after injection-molded article P is housed in pocket 148, pocket 148 is sealed with top film TF and cut. Although not illustrated in the drawings, packaging machine 140 is provided with a feeding section that intermittently feeds bottom film BF sent out from first rolled web 146. Under the control of control section 180, the feeding section causes movement from first rolled web 146 to heating section 141, movement from drawing section 142 to housing section 143, movement from housing section 143 to sealing section 144, and movement from sealing section 144 to cutting section 145. It is to be noted that the material of bottom film BF is not limited, and can be appropriately selected in accordance with the function, property, and the like required for the packaging.

Heating section 141 applies heat to bottom film BF. Heating section 141 includes heat source 147 that is controlled by control section 180. Heat source 147 is disposed on the upper side of bottom film BF. Heat source 147 heats a region of bottom film BF used as pocket 148 up to a temperature that softens the region and allows for the drawing. Typically, bottom film BF has a multi-layer structure, and the compositions of the layers are different from one another. In such case, at the time of softening bottom film BF, it is preferable to apply heat to the layers at a temperature that is equal to or greater than the glass transition temperature (Tg) of the material of at least one of the layers.

Drawing section 142 performs a drawing process of forming pocket 148 on heated bottom film BF by drawing. Drawing section 142 includes mold 149 and suction pump 150. Mold 149 is disposed under bottom film BF on the side opposite to heating section 141. Mold 149 is formed of, for example, a metal or the like that does not cause deformation when making contact with heated bottom film BF, but the material of mold 149 is not limited. In addition, in the present embodiment, mold 149 is not temperature controlled. That is, in clean room 190, the temperature of mold 149 has a normal temperature. The shape of mold 149 is appropriately designed in accordance with the shape of pocket 148 to be formed. Mold 149 is connected with suction pump 150. By vacuum suction of suction pump 150, drawing is performed on the heated portion of bottom film BF in accordance with the shape of mold 149, thus forming pocket 148.

After pocket 148 is moved to a position where injection-molded article P is housed, housing section 143 houses in pocket 148 injection-molded article P conveyed by conveying machine 160.

Sealing section 144 seals the opening of pocket 148 in which injection-molded article P is housed with top film TF. Sealing section 144 includes roller 151 and sealer 152. Roller 151 is disposed on the upstream side relative to sealer 152 in the feeding direction of bottom film BF. Sealer 152 includes heat sealer 153 and sealing stage 154.

Roller 151 is disposed at a position that allows top film TF intermittently fed from second rolled web 155 to cover the opening of pocket 148 of bottom film BF, and roller 151 is configured to change the feeding direction of top film TF to the direction same as the feeding direction of bottom film BF. Top film TF is intermittently fed by the feeding section together with bottom film BF, thus covering the opening immediately after injection-molded article P is housed. In addition, for the purpose of preventing the internal surface (surface facing the interior of pocket 148) of top film TF from being contaminated, roller 151 is in contact with the external surface (surface not facing the interior of pocket 148) of top film TF. With this configuration, it is possible to prevent foreign matters that naturally drop in clean room 190 from entering pocket 148, whereby packaged injection-molded article P whose cleanliness is ensured can be acquired. The material of top film TF is not limited, and can be appropriately selected in accordance with the function, property and the like required for the packaging.

Sealer 152 is disposed under bottom film BF and is vertically movable. Sealer 152 includes sealing stage 154 and heat sealer 153. Sealing stage 154 has an opening slightly larger than pocket 148. Heat sealer 153 is disposed above top film TF on the side opposite to sealing stage 154, and has a shape surrounding the opening of pocket 148. In sealing section 144, after intermittently fed bottom film BF and top film TF are moved to a sealing position, sealing stage 154 is lifted such that pocket 148 is inserted into the opening. Then, sealing stage 154 is further lifted to sandwich bottom film BF and top film TF between sealing stage 154 and heat sealer 153, and the outer periphery of the opening and top film TF are bonded by thermal welding for the sealing. In this manner, injection-molded article P is packaged with bottom film BF and top film TF.

In cutting section 145, sealed bottom film BF and top film TF are cut at a predetermined position between each injection-molded article P. Cutting section 145 includes cutter 156 that cuts sealed bottom film BF and top film TF from the upper and lower sides. It is to be noted that the position for cutting top film TF and bottom film BF may be located on the seal as long as the sealing state of pocket 148 and top film TF is maintained.

(Conveying Machine)

Conveying machine 160 conveys injection-molded article P produced by injection molding machine 120 to packaging machine 140. Conveying machine 160 includes arm 161 that grabs injection-molded article P, and planar movement section 162 that causes arm 161 to move in the XY direction in plan view. Conveying machine 160 grabs injection-molded article P, which has just been produced, with arm 161, and conveys the injection-molded article P to packaging machine 140, and then, houses the injection-molded article P in pocket 148 of bottom film BF. At this time, injection-molded article P does not make contact with components other than conveying machine 160.

(Control Section)

Control section 180 generally controls injection molding machine 120, packaging machine 140 and conveying machine 160. For example, control section 180 is composed of a computer. As described later, control section 180 generally controls injection molding machine 120, packaging machine 140 and conveying machine 160 to match the timings of the molding cycle and the packaging cycle with each other. In addition, control section 180 synchronizes the processes from the mold opening process performed by injection molding machine 120 to the taking out process performed by conveying machine 160, with the processes from the moving process performed by packaging machine 140 to the conveying process performed by conveying machine 160. To be more specific, the taking out process performed by conveying machine 160 and the moving process performed by packaging machine 140 (a process of moving pocket 148 that houses injection-molded article P taken out in a given cycle from drawing section 142 to housing section 143) are performed in the same period in a given cycle such that the taking out process performed by conveying machine 160 and the conveying process performed by conveying machine 160 do not overlap each other. When these timings do not match each other, conveying machine 160 holding injection-molded article P may be put into a standby state during movement of pocket 148 from drawing section 142 to housing section 143, and pocket 148 that houses no injection-molded article P may be moved from housing section 143 to sealing section 144. Control section 180 adjusts the timings so that such problems are not caused.

(Operation of Manufacturing Apparatus)

Next, the operation of manufacturing apparatus 100 for packaged injection-molded article P will be described.

In injection molding machine 120, first, metal mold 129 is closed by mold clamping section 122 (mold clamping process). Next, melted resin is supplied into metal mold 129 by injection section 121 (filling process). Then, metal mold 129 filled with the melted resin is subjected to pressure holding and natural cooling (pressure holding process). Further, closed metal mold 129 is opened (mold opening process). Finally, injection-molded article P is taken out from opened metal mold 129 (taking out process).

In packaging machine 140, first, bottom film BF is intermittently fed by the feeding section and moved to a heating position (moving process 1). Next, heating section 141 applies heat to a region for forming pocket 148 on bottom film BF to soften the region (heating process). Then, the suction pump sucks heated bottom film BF, whereby pocket 148 is formed on heated bottom film BF by drawing (drawing process). Pocket 148 thus formed is moved to a housing position (moving process 2). Then, injection-molded article P, which has just been produced by injection molding machine 120, conveyed by conveying machine 160 is housed in pocket 148 of bottom film BF (housing process). Next, pocket 148 in which injection-molded article P is housed is moved to a sealing position (moving process 3). Then, the opening of housing pocket 148 fed to the sealing position in which injection-molded article P is housed is sealed with top film TF (sealing process). Bottom film BF is moved such that the sealing position of bottom film BF and top film TF is on the downstream side relative to cutter 156 in the feeding direction of bottom film BF (moving process 4). Finally, cutting section 145 cuts top film TF and bottom film BF, and thus a package is acquired (cutting process).

As described above, typically, the time required for the molding cycle of injection molding is longer than the time required for the packaging cycle. Accordingly, in the case where packaged injection-molded articles P are successively manufactured, if the molding cycle and the packaging cycle do not match each other, injection-molded article P, bottom film BF and top film TF may be wasted, and the desired manufacturing amount per unit time may not be ensured. In addition, since the time during which injection-molded article P may make contact with particles or the like may be long, injection-molded article P may be contaminated.

Under such circumstances, matching the molding cycle and the packaging cycle with each other may be a possible solution to successively manufacture packaged injection-molded articles P. However, for example, when packaging machine 140 is kept in a standby state, bottom film BF is kept heated in heating section 141, and is excessively softened. When bottom film BF is excessively softened in this manner, the shape of mold 149 cannot be correctly transferred to bottom film BE To avoid such problems, in manufacturing apparatus 100 according to the present embodiment, a time for a predetermined process in the packaging process is extended to synchronize the molding cycle with a part of the packaging cycle. To be more specific, manufacturing apparatus 100 according to the present embodiment is configured to match a molding cycle from a mold clamping process to the next mold clamping process performed by injection molding machine 120, and a time from a moving process to the next moving process in the packaging process performed by packaging machine 140 (a time during which bottom film BF is kept stopped at each position (heating section 141, drawing section 142, housing section 143, sealing section 144 or cutting section 145) where each process is performed during the period from a moving process to the next moving process in the packaging cycle) by a method (1) in which the heating start time is delayed in the heating process, by a method (2) in which the temperature rising rate is reduced in the heating process, or by a method (3) in which the drawing time is increased in the drawing process.

Figure 4:
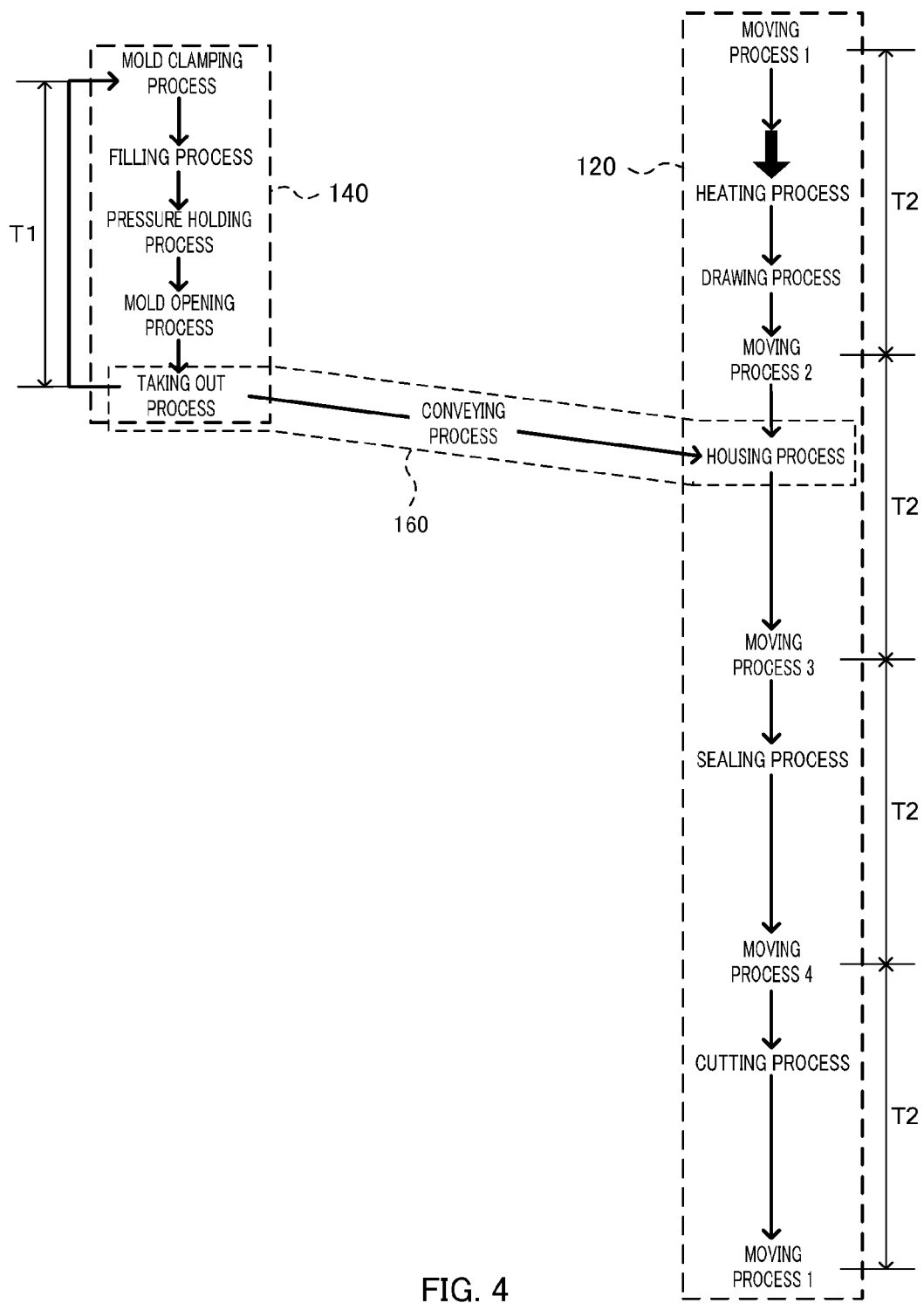
FIG. 4 is an explanatory diagram of a method for matching a molding cycle and a part of a packaging cycle.
Figure 5:
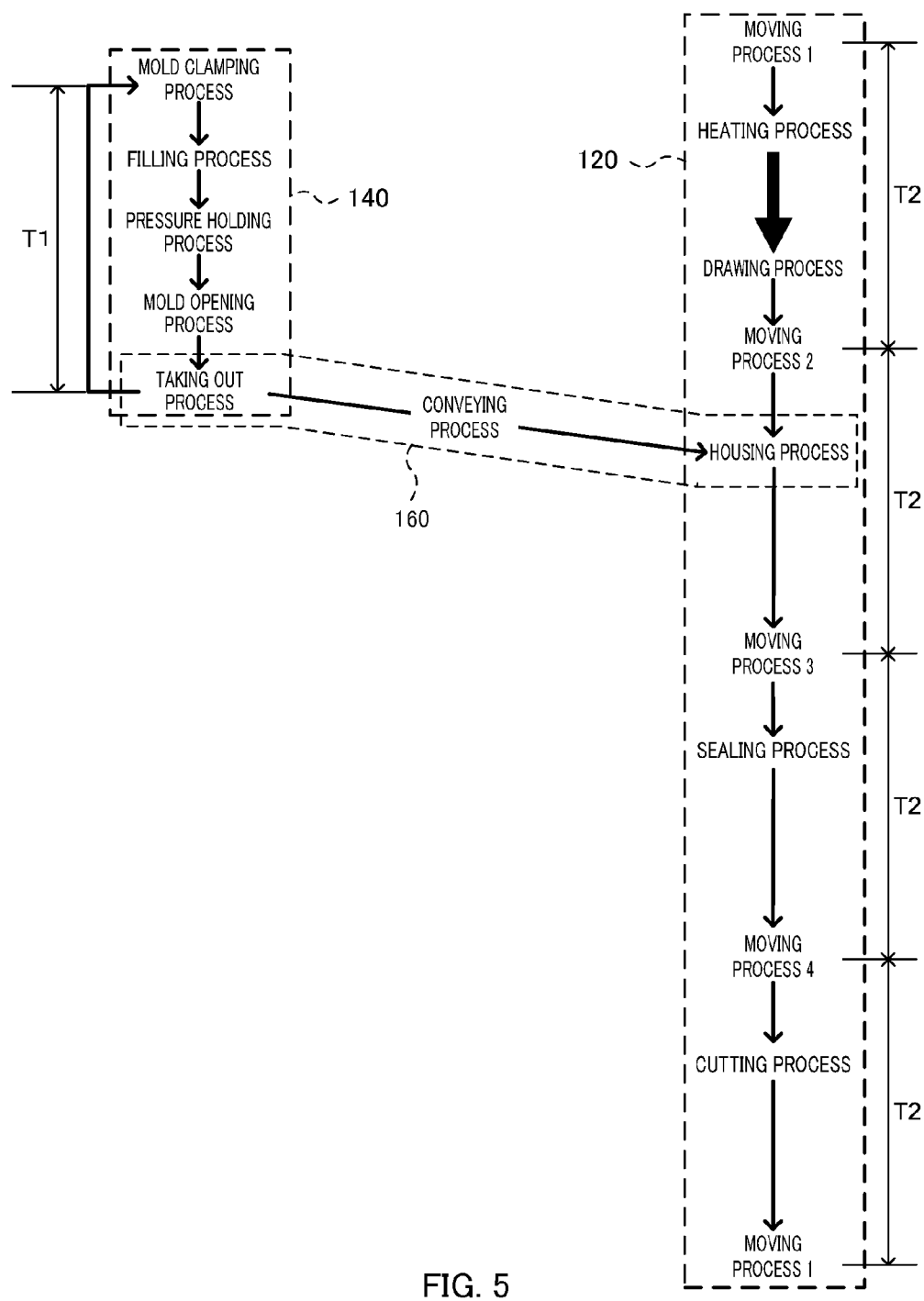
FIG. 5 is an explanatory diagram of a method for matching the molding cycle and a part of the packaging cycle.
Figure 6:
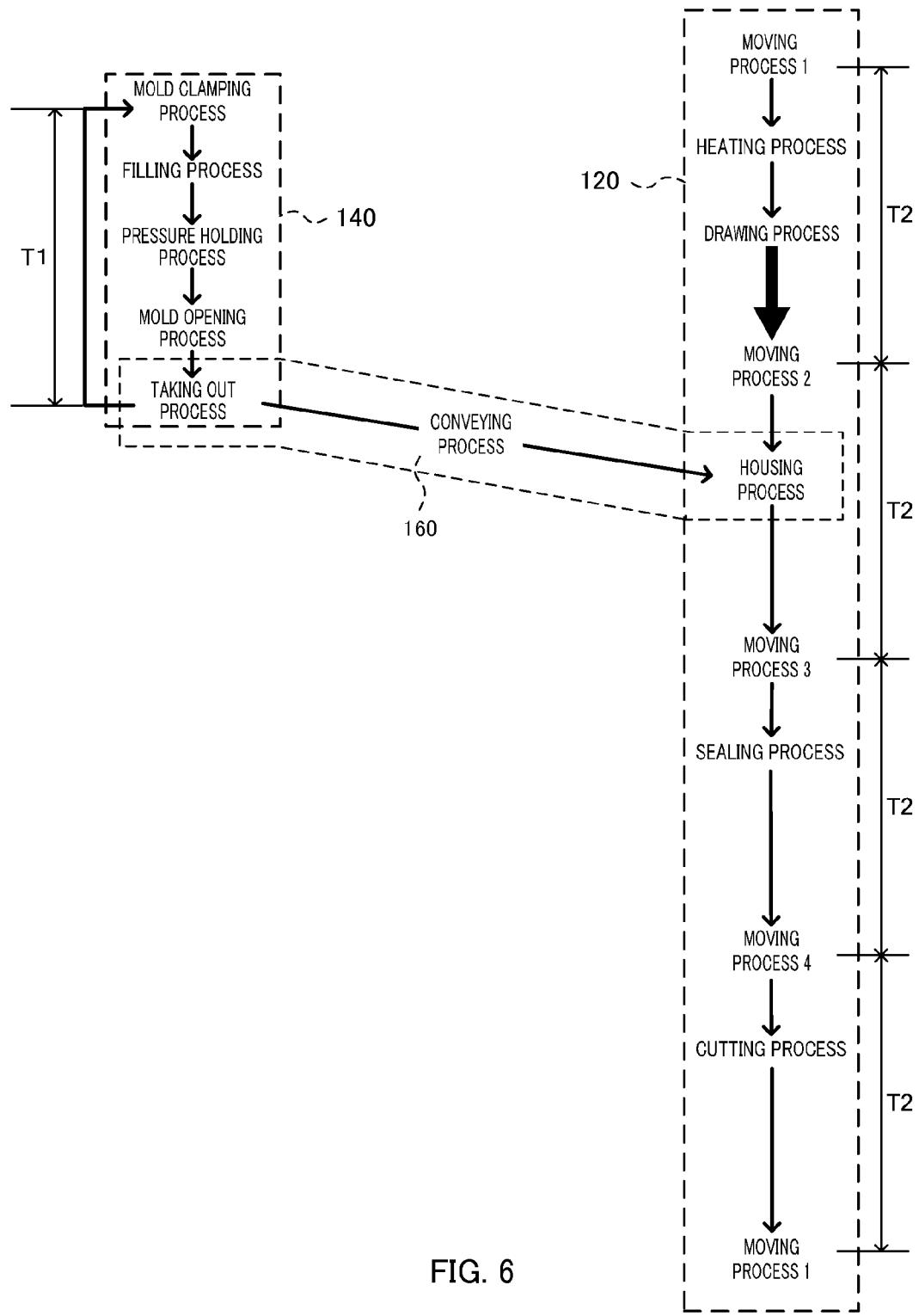
FIG. 6 is an explanatory diagram of a method for matching the molding cycle and a part of the packaging cycle.

FIGS. 4 to 6 are explanatory diagrams of methods of matching the molding cycle and a time from a moving process to the next moving process in the packaging cycle. FIG. 4 shows a matching method (1) in which the heating start time is delayed in the heating process. FIG. 5 shows a matching method (2) in which the temperature rising rate is reduced. FIG. 6 shows a matching method (3) in which the drawing time is increased in the drawing process. As shown in FIGS. 4 to 6, it is possible to match molding cycle (T1) and time (T2) from a moving process to the next moving process in the packaging cycle without causing problems in the molding process and the packaging process by the method (1) in which the heating start time is delayed in the heating process, by the method (2) in which the temperature rising rate is reduced in the heating process, or by the method (3) in which the drawing time is increased in the drawing process.

Figure 7:
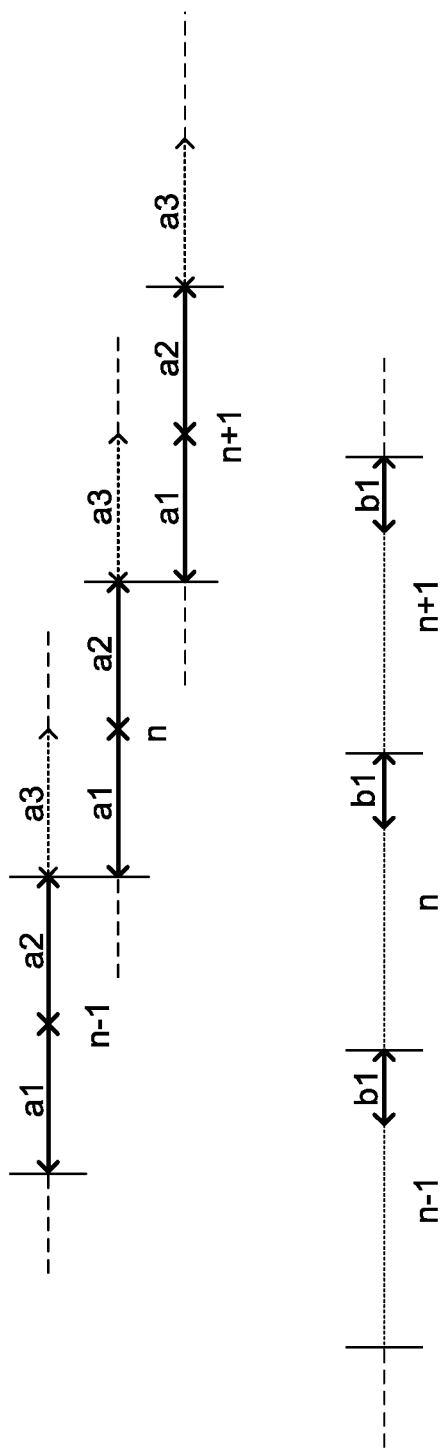
FIG. 7 is a conceptual view of a method for synchronizing the molding cycle with a part of the packaging cycle.

FIG. 7 is a conceptual view of a method of synchronizing the molding cycle and a part of the packaging cycle. In FIG. 7, "a1" represents "moving process 2," "a2" represents the housing process performed by packaging machine 140 and the conveying process performed by conveying machine 160, and "a3" represents moving process 3. In addition, "b1" represents the mold opening process performed by molding machine 120 and the taking out process performed by conveying machine 160. In addition, "n" represents the number of the molding cycles and the packaging cycles.

As illustrated in FIG. 7, in manufacturing apparatus 100 according to the present embodiment, the mold opening process performed by injection molding machine 120 to the taking out process performed by conveying machine 160 (b1), and the moving process performed by packaging machine 140 to the conveying process performed by conveying machine 160 (a1) are partially simultaneously carried out such that the taking out process performed by conveying machine 160 and the conveying process performed by conveying machine 160 do not overlap each other. In this manner, injection-molded article P which has just been produced can be appropriately housed in pocket 148.

(Effect)

As described above, in manufacturing apparatus 100 and the manufacturing method according to Embodiment 1, the molding cycle and the time from a moving process to the next moving process in the packaging cycle (stopping time at each position on bottom film BF) are matched by increasing the time for the packaging process to synchronize the processes from the mold opening process performed by injection molding machine 120 to the taking out process performed by conveying machine 160, with the processes from the moving process performed by packaging machine 140 to the conveying process performed by conveying machine 160, whereby injection-molded article P which has just been produced can be appropriately housed in pocket 148. Thus, packaged injection-molded article P whose hygiene is ensured can be manufactured.

In addition, in the case where the molding cycle and a part of the packaging cycle are synchronized by increasing the drawing time in the drawing process, pocket 148 formed by drawing of bottom film BF that tends to shrink when it is cooled is continuously subjected to vacuum suction. Thus, in comparison with the case where pocket 148 is removed from mold 149 immediately after pocket 148 is molded, natural shrinkage is limited by pocket 148, and the cavity shape of mold 149 can be accurately transferred. Consequently, the quality of the package is enhanced.

Embodiment 2

(Configuration of Manufacturing Apparatus for Packaged Molded Article)

Figure 8:
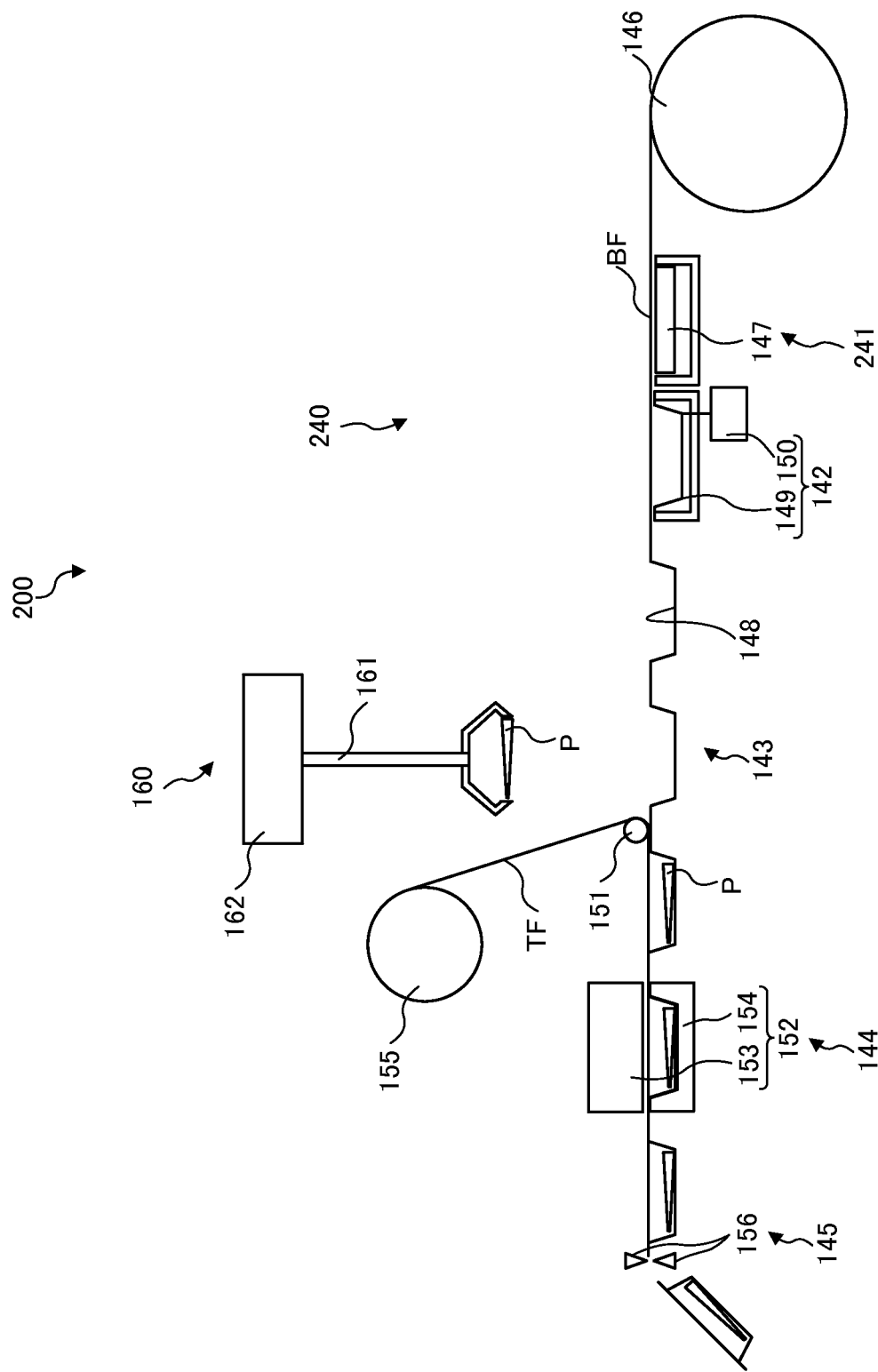
FIG. 8 is a schematic right side view of a manufacturing apparatus according to Embodiment 2 of the present invention.

FIG. 8 is a side view of manufacturing apparatus 200 for manufacturing packaged injection-molded article P according to Embodiment 2 as viewed from packaging machine 240 side. In FIG. 8, as with FIG. 3, injection molding machine 120 and control section 180 are omitted.

As illustrated in FIG. 8, manufacturing apparatus 200 includes injection molding machine 120, packaging machine 240, conveying machine 160 and control section 180. Manufacturing apparatus 200 according to Embodiment 2 is different from of manufacturing apparatus 100 according to Embodiment 1 in the configuration of packaging machine 240. Therefore, the same components as those of manufacturing apparatus 100 according to Embodiment 1 are denoted by the same reference numerals, and the descriptions thereof are omitted.

Packaging machine 240 includes heating section 241, drawing section 142, housing section 143, sealing section 144 and cutting section 145.

Heating section 241 is disposed under bottom film BF on the upstream side relative to drawing section 142 in the feeding direction of bottom film BF. That is, in Embodiment 2, heating section 241 and drawing section 142 are disposed side by side in the feeding direction of bottom film BF.

(Operation of Manufacturing Apparatus)

The operation of manufacturing apparatus 200 for manufacturing packaged injection-molded article P according to Embodiment 2 is identical to manufacturing apparatus 100 of Embodiment 1 except that heated bottom film BF is moved from heating section 141 to drawing section 142 when heated bottom film BF is subjected to drawing. Also in manufacturing apparatus 200 of Embodiment 2, control section 180 adjusts the timings of the molding cycle and the packaging cycle to partially synchronize the processes from the mold opening process performed by injection molding machine 120 to the taking out process performed by conveying machine 160, with the processes from the moving process performed by packaging machine 240 to the conveying process performed by conveying machine 160.

(Effect)

With the above-mentioned configuration, in manufacturing apparatus 200 according to Embodiment 2, heating section 241 and drawing section 142 are disposed under bottom film BF, and thus unnecessary devices are not disposed above the portion serving as the internal surface of pocket 148 until injection-molded article P is conveyed thereto. In this manner, cleanliness of the portion serving as the internal surface of pocket 148 is further ensured.

It is to be noted that, in the manufacturing apparatus according to the embodiments of the present invention, the configurations of the molding machine and the packaging machine are not limited to above-mentioned configurations, and it is possible to adopt a known packaging machine and a known molding machine that can perform the molding process including the mold clamping process, the filling process, the pressure holding process, the mold opening process and the taking out process.

This application is entitled to and claims the benefit of Japanese Patent Application No. 2013-001958 filed on Jan. 9, 2013, the disclosure of which including the specification, drawings and abstract is incorporated herein by reference in its entirety.

INDUSTRIAL APPLICABILITY

A packaged injection-molded article manufactured in accordance with the present invention is excellent in cleanliness, and therefore can be widely applied to various kinds of injection-molded articles that are required to be endotoxin free and the like, for example.

REFERENCE SIGNS LIST 100, 200 Manufacturing apparatus
120 Injection molding machine
121 Injection section
122 Mold clamping section
123 Hopper
124 Cylinder
125 Hopper main body
126 Input port
127 Communication port
128 Nozzle section
129 Metal mold
129a First metal mold
129b Second metal mold 130 Mold clamping mechanism
131 First plate
132 Second plate
133 Rail
140, 240 Packaging machine
141, 241 Heating section
142 Drawing section
143 Housing section
144 Sealing section
145 Cutting section
146 First rolled web
147 Heat source
148 Pocket
149 Mold
150 Suction pump
151 Roller
152 Sealer
153 Heat sealer
154 Sealing stage
155 Second rolled web
156 Cutter
160 Conveying machine
161 Arm
162 Planar movement section
180 Control section
190 Clean room
191 Air conditioner
BF Bottom film
TF Top film
P Injection-molded article

The invention claimed is:

1. A manufacturing method for a packaged molded article, the method comprising:
   molding to form a molded article;
   packaging the molded article; and
   conveying the molded article from the molding to the packaging,
   wherein: the molding step includes:
      mold-clamping an opened metal mold after the molded article is taken out from a metal mold,
      filling the metal mold with resin,
      pressure-holding the resin in the metal mold,
      mold-opening the metal mold, and
      taking out the molded article from the opened metal mold,
   wherein the packaging step includes:
      heating a bottom film,
      drawing the heated bottom film to form a pocket,
      housing the molded article in the pocket,
      sealing with a top film an opening of the pocket in which the molded article is housed, and
      moving the bottom film by a predetermined distance;
   wherein the conveying step includes:
      conveying the molded article taken out from the opened metal mold into the pocket to perform the housing, and
   wherein:
   at least the heating, the housing and the sealing are performed after the moving; and
   a time during which the bottom film is kept stopped between each moving in the packaging is matched with a molding cycle between each mold-clamping in the molding by delaying a heating start time in the heating, by reducing a temperature rising rate in the heating, or by increasing a drawing time in the drawing.

2. The method according to claim 1, wherein the time during which the bottom film is kept stopped between each moving in the packaging is matched with the molding cycle between each mold-clamping in the molding by increasing the drawing time in the drawing.

3. A manufacturing apparatus for a packaged molded article, the manufacturing apparatus comprising:
   a molding machine that forms a molded article;
   a packaging machine that packages the molded article;
   a conveying machine that conveys the molded article from the molding machine to the packaging machine; and
   a control section that controls the molding machine, the packaging machine and the conveying machine,
   wherein:
   the molding machine performs molding, the molding including:
      mold-clamping an opened metal mold after a molded article is taken out from the metal mold,
      filling the metal mold with resin,
      pressure-holding the resin in the metal mold, and
      mold-opening the metal mold;
   the packaging machine performs packaging, the packaging including:
      heating a bottom film,
      drawing the heated bottom film to form a pocket,
      housing the molded article in the pocket,
      sealing with a top film an opening of the pocket in which the molded article is housed, and
      moving the bottom film by a predetermined distance;
   the conveying machine performs
      taking out the molded article from the metal mold opened by the molding machine, and
      conveying the molded article taken out from the opened metal mold into the pocket to perform the housing,
   the control section controls the molding machine, the packaging machine and the conveying machine; and
   the control section synchronizes the mold-opening performed by the molding machine in the molding to the taking out performed by the conveying machine with the moving performed by the packaging machine in the packaging in which a stopping time of the bottom film is adjusted to the conveying performed by the conveying machine by delaying a heating start time in the heating, by reducing a temperature rising rate in the heating, or by increasing a drawing time in the drawing.

4. The manufacturing apparatus according to claim 3, wherein the control section synchronizes the mold-opening performed by the molding machine in the molding to the taking out performed by the conveying machine with the moving performed by the packaging machine in the packaging in which the stopping time of the bottom film is adjusted to the conveying performed by the conveying machine by increasing the drawing time in the drawing.

* * * * *